Oct. 27, 1925.
F. S. KOCHENDORFER
1,559,260
MOUNTING FOR SHEET LIKE ARTICLES
Filed June 19, 1923
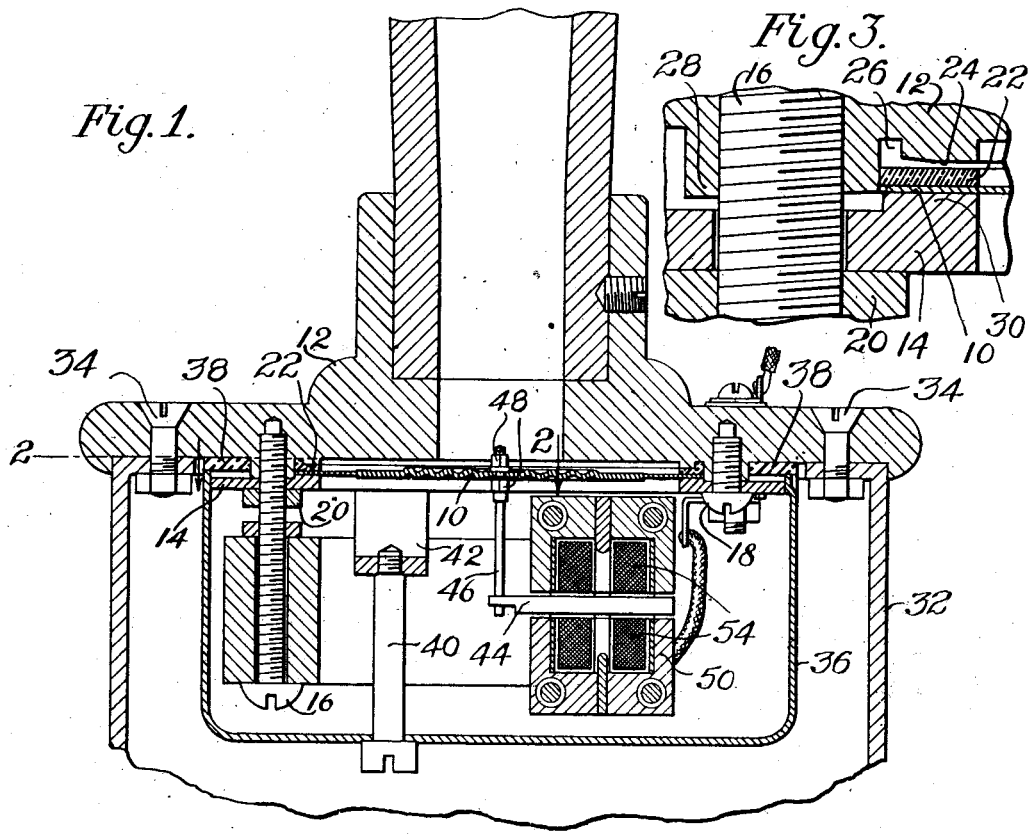
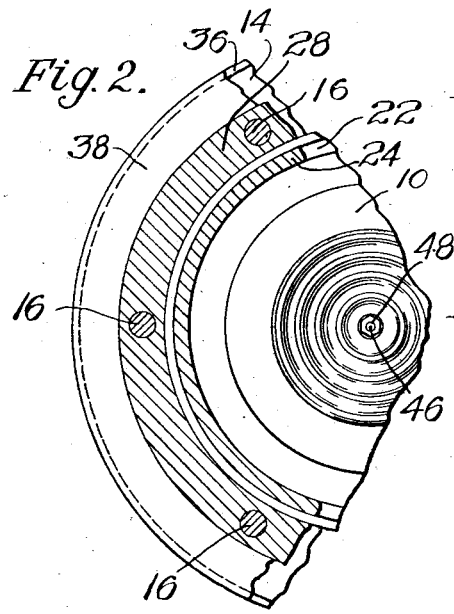
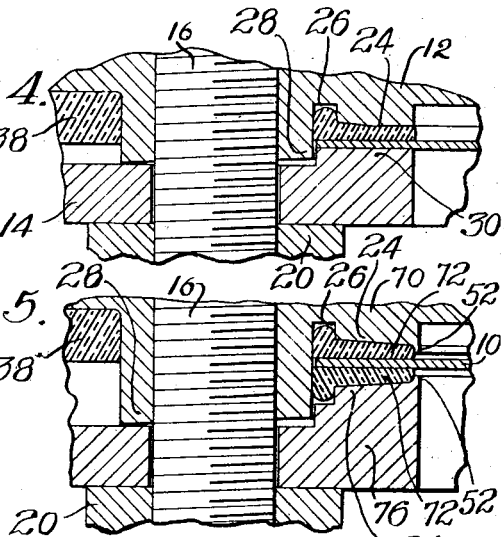
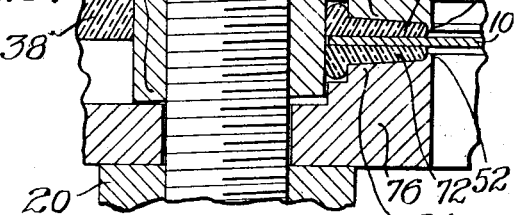
Inventor
Frederic S. Kochendorfer
by H. A. Pattison.
Att'y Patented Oct. 27, 1925.

1,559,260

UNITED STATES PATENT OFFICE.

FREDERIC S. KOCHENDORFER, OF RIVER FOREST, ILLINOIS, ASSIGNOR TO WESTERN ELECTRIC COMPANY, INCORPORATED, OF NEW YORK, N. Y., A CORPORATION OF NEW YORK.

MOUNTING FOR SHEETLIKE ARTICLES.

Application filed June 19, 1923. Serial No. 646,447.

To all whom it may concern:

Be it known that I, FREDERIC S. KOCHENDORFER, a citizen of the United States, residing at River Forest, in the county of Cook and State of Illinois, have invented certain new and useful Improvements in Mountings for Sheetlike Articles, of which the following is a full, clear, concise, and exact description.

This invention relates to mountings for sheet-like articles and more particularly to mountings for diaphragms.

In certain types of apparatus a sheet-like article is employed as a diaphragm upon which impulses are impinged. It is sometimes desirable, especially where the diaphragm is used for the translation of electrical or mechanical impulses into sound waves or the reverse, that the diaphragm be tautened, and firmly held in this condition.

In mounting a diaphragm by means of a resilient gasket of compressible material seated between flat surfaced members, it might happen that upon the drawing together of the members, there would be a tendency to displace a portion of the gasket material toward the center, and this might carry the periphery of the diaphragm with it, thereby distorting the diaphragm.

An object of the present invention is to mount a diaphragm so as to tauten it, and to maintain it taut.

Another object is to simplify the mounting of a diaphragm in a taut condition.

In order to attain these objects there is provided, in accordance with one embodiment of the invention, a circular diaphragm, supported between two separable members, either or both of which may hold a resilient gasket in intimate contact with the diaphragm, the portion of the separable members forming the seat for the diaphragm being machined so as to slope outwardly away from the diaphragm, and having around their peripheries annular channels, or pockets, to provide a space for receiving gasket material displaced by the drawing together of the separable members.

An additional feature of the invention, which may be beneficially employed in the seating of larger diaphragms where a considerable amount of gasket material is displaced upon drawing the parts together, is the provision of a lip, or ridge, on the central edge of the sloping gasket seat to still further retard displacement toward the center of the diaphragm.

These and other features of the invention not specifically mentioned will appear from the following description and the accompanying drawings, in which Fig. 1 is a sectional view of a telephone receiver of the loudspeaker type in which the present invention is embodied, portions thereof being broken away;

Fig. 2 shows a partial section on the line 2—2 of Fig. 1;

Fig. 3 shows an enlarged fragmentary section illustrating the seating of the gasket and associated parts before they are completely assembled;

Fig. 4 shows a section corresponding to that of Fig. 3, but with the parts drawn together tightly, and Fig. 5 is a view similar to Fig. 4 showing a modified form of the invention.

Referring to the drawings in detail, a diaphragm 10 is held in position between members comprising an annular cover member 12 of metal, and an annular member 14, these two members being connected to each other by means of screws 18, and nuts 20 on longer screws 16, which are placed at various points about the annular members as best seen in Fig. 2.

It will be noted that the annular member 14 is so machined that the central part 30 of the face adjoining member 12 is higher than the outer part thereof, and that the diaphragm 10 to be mounted, rests upon this raised portion. The lower face of the annular cover member 12 is here shown cut away in the center, but the purpose of this is merely to leave the diaphragm free to vibrate.

In the construction of the gasket seat in member 12, an annular ridge 24 has its lower face cut at an angle, so that the outer edge thereof is lower than the inner, and around this ridge is an annular channel 26. Beyond the channel is another ridge 28, higher and broader than the first, the lower face of which slopes in the opposite direction from that of ridge 24, namely, so that the outer edge is higher than the inner.

An annular gasket 22, of resilient material, is held in place between the annular cover member 12 and the diaphragm 10, some of the gasket material being displaced into the channel 26 when the parts are drawn together.

A modification is shown in Fig. 5, where it will be noted that two annular members 70 and 76 substantially the same as those illustrated in the first four figures are each provided with a gasket seat; that a resilient gasket 72 is mounted upon either side of the diaphragm 10, and there is provided in addition a ridge 52, or lip, on the inner edge of each gasket seat. Except for these distinctions the modified form shown in Fig. 5 corresponds to that shown in the other views.

A cylindrical base member 32 is fastened to the annular mounting member 12 by suitable means, for instance, bolts 34, while a dust-proof housing 36, which surrounds the apparatus, used for translating electrical variations into sound waves, is held in close contact with an annular dust excluding member 38, which may be of rubber, by means of screws 40 fastened to brackets 42 extending from the annular cover member 12.

To describe briefly the structure with which the diaphragm is here associated, a soft iron armature 44 is suspended between electromagnets 50, the adjoining poles of which are of opposite polarity, and which, when a pulsating electrical current is passed through their coils 54, produce a magnetic field of varying intensity, which sets up in the armature 44 longitudinal torques corresponding in period to the variations in the magnetic field surrounding the electromagnets, and the arm 46 transmits them, piston-like, to the diaphragm 10, causing it to vibrate in unison with the armature, and produce, in a well known manner, sound waves having a period corresponding to that of the electrical variations through the magnet coils.

Small nuts 48 secure the arm 46 to the diaphragm which, as shown here, may be of built up layers of linen, impregnated with a hardening and preserving material, and impressed with concentric circular corrugations.

The parts employed in seating the diaphragm are, the annular members 12 and 14, the annular gasket 22, the diaphragm 10, the screws 16 and 18, and the nuts 20.

The gasket should have an inside diameter approximately equal to the inside diameter of ridge 24, an outside diameter equal to or perhaps a trifle less than the inside diameter of ridge 28, while the diaphragm should fit loosely within the ridge 28, as should also the raised portion 30 of annular member 14.

In assembling these parts the diaphragm is placed upon the raised portion 30 of member 14, the gasket 22 is placed upon the upper surface of the diaphragm, the cover member 12 is put in place, and the screws 18 and nuts 20 are turned down. Just before the parts come together they will appear as in Fig. 3, and when they are in their final position they will appear as in Fig. 4.

The outwardly sloping face of ridge 24 forces the displaced gasket material outwardly into the channel 26, and the tendency of this resilient material to resume its normal shape will act to draw the part in contact with the diaphragm outwardly and thus exerts a continuous force on the diaphragm outwardly from its center which will tend to hold it taut.

Just before the parts reach their final position the outer edge of ridge 28 will come in contact with the low portion of member 14, and a further drawing together of the parts will force the inner edge of the annular member 14 to be drawn toward the comparatively inflexible cover member 12, the outer edge of the ridge 28 acting as a fulcrum, thereby exerting a still further tautening effect on the diaphragm.

From the description of the above structure and the method of assembling it, it is believed that the modification illustrated in Fig. 5 will be readily comprehended. It will be noted in this figure that two gaskets are used instead of one, and, in addition, there is provided on the central edge of each gasket seat, a small ridge 52 to still further retard central displacement of gasket material.

To bring out the necessity for a mounting which will hold a diaphragm taut, suppose for example, that upon being mounted, the periphery of a diaphragm of the type illustrated herein were forced inwardly toward its center. This would warp the diaphragm and cause it to curve so that the center thereof would be either higher or lower than the periphery. Assuming, for the purpose of illustration, that a diaphragm has been mounted in a manner which has forced the upper surface into a concave arch, and that the armature 44 has been adjusted to have an equal clearance from the magnets on either side, when the diaphragm is subjected to the piston-like action of the rod 46, the diaphragm may, in some instances, suddenly snap into a position where its upper surface is convex, causing a loud noise in the receiver, and throwing the armature out of adjustment. Should this happen, translation of electrical variations through the magnet coils into sound waves might be distorted.

What is claimed is:

1. A mounting for a sheet-like article comprising a resilient member, a mounting member having a pocket to allow therein displacement of the resilient member, and means for causing a relative movement of the mounting member and the article to displace the resilient member and tauten the article.

2. A mounting for a sheet-like article comprising a resilient member, a mounting member having a ridge with a sloping face in seating relation to said resilient member, and a pocket adjacent to said ridge to permit displacement of the resilient member, and means to cause a relative movement between the mounting member and the article to displace the resilient member and tauten the article.

3. A mounting for a sheet-like article comprising a mounting member, a resilient member between said mounting member and said article, a projection on the mounting member to resist displacement of the resilient member, and means to cause a relative movement of the article and the mounting member to tauten the article.

4. A mounting for a sheet-like article comprising a mounting member having thereon two ridges with oppositely sloping faces, a planiform member to act with one ridge to give a lever action to said planiform member, a resilient member in seating relation with the other ridge, and means to cause a relative movement between the mounting member and the planiform member to displace the resilient member and tauten the article.

5. A mounting for a sheet-like article comprising a plurality of resilient members, a plurality of mounting members, each having thereon a ridge with a sloping face in seating relation to a resilient member and a pocket adjacent to said ridge to allow displacement of said resilient member, and means to cause a relative movement of the mounting members to displace the resilient member and tauten the article.

6. A mounting for a diaphragm comprising a resilient member, an annular mounting member having an annular ridge in seating relation to said resilient member, said ridge having a projection on its inner edge to resist central displacement of the resilient member and a pocket around said ridge to allow outward displacement of the resilient member, and means to cause a relative movement between the mounting member and the diaphragm to displace the resilient member and tauten the diaphragm.

7. A mounting for a diaphragm comprising an annular mounting member, an annular ridge thereon, the face of which is beveled outwardly, an annular channel around said ridge, a second ridge beyond said channel, the face of which is beveled inwardly, a second annular mounting member to cooperate with the first in holding the diaphragm, a resilient gasket to seat between the first mentioned ridge and the diaphragm, and means for causing a relative movement between the annular members to displace the resilient member and tauten the diaphragm.

8. A mounting for a circular diaphragm having concentric corrugations, an annular ridge thereon, the face of which is beveled outwardly, an annular channel around said ridge, a second ridge beyond said channel, the face of which is beveled inwardly, a second annular mounting member to co-operate with the first in holding the circular diaphragm, a resilient gasket to seat between the first mentioned ridge and the circular diaphragm, and means for causing a relative movement between the annular members to displace the resilient member and tauten the circular diaphragm.

9. A mounting for a sheet-like article comprising a resilient member, a mounting member having a pocket to allow therein displacement of the resilient member, said pocket extending at right angles to the plane of the article, and means for causing a relative movement of the mounting member and the article to displace the resilient member and tauten the article.

10. A mounting for a sheet-like article comprising a mounting member, a resilient member between said mounting member and said article, a projection on the mounting member to resist displacement of the resilient member, said mounting member having a pocket to allow therein displacement of the resilient member, and means for causing a relative movement of the mounting member of the article to displace the resilient member and tauten the artice.

11. A mounting for a sheet-like article comprising a mounting member, a resilient member between said mounting member and said article, a projection on the mounting member to resist displacement of the resilient member, said mounting member having a pocket to allow therein displacement of the resilient member, said pocket extending at substantially right angles to the surface of the article, and means for causing a relative movement of the mounting member of the article to tauten the article.

In witness whereof, I hereunto subscribe my name this 7th day of June A. D., 1923.

FREDERIC S. KOCHENDORFER.